United States Patent
McClelland (10) Patent No.: US 12,082,516 B2
(45) Date of Patent: Sep. 10, 2024

(54) AUTOMATIC IMPLEMENT DETECTION AND MANAGEMENT SYSTEM

(71) Applicant: CNH Industrial America LLC, New Holland, PA (US)

(72) Inventor: Brett McClelland, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 666 days.

(21) Appl. No.: 17/135,477

(22) Filed: Dec. 28, 2020

(65) Prior Publication Data
US 2022/0201920 A1   Jun. 30, 2022

(51) Int. Cl.
*A01B 69/00* (2006.01)
*A01B 69/08* (2006.01)

(52) U.S. Cl.
CPC .......... *A01B 69/001* (2013.01); *A01B 69/006* (2013.01); *A01B 69/007* (2013.01)

(58) Field of Classification Search
CPC .................................................. A01B 69/001
See application file for complete search history.

(56) References Cited

U.S. PATENT DOCUMENTS

| | | | | |
|---|---|---|---|---|
| 4,423,883 A | * | 1/1984 | Wallentowitz | B62D 3/02 280/93.513 |
| 5,018,757 A | * | 5/1991 | Kozuka | B62D 7/06 280/5.523 |
| 5,129,477 A | * | 7/1992 | Hurlburt | B60K 17/30 180/265 |
| 6,933,837 B2 | | 8/2005 | Gunderson et al. | |
| 6,990,399 B2 | * | 1/2006 | Hrazdera | A01B 69/008 701/50 |
| 7,689,356 B2 | | 3/2010 | Dix et al. | |
| 8,165,407 B1 | | 4/2012 | Khosla et al. | |
| 9,041,806 B2 | | 5/2015 | Baur et al. | |
| 9,085,261 B2 | | 7/2015 | Lu et al. | |
| 9,232,688 B2 | | 1/2016 | Kormann et al. | |

(Continued)

FOREIGN PATENT DOCUMENTS

| | | | | |
|---|---|---|---|---|
| CN | 106960216 A | * | 7/2017 | ........... G06K 9/6201 |
| CN | 208026252 U | | 10/2018 | |

(Continued)

OTHER PUBLICATIONS

"CabCAM Cabled Rear-View System with 1 Camera", A & I Products, Farmtronics Ltd.—Farm Electronics Online Store, Oct. 21, 2019 (5 pages).

(Continued)

*Primary Examiner* — Shelley Chen
(74) *Attorney, Agent, or Firm* — Rickard K. DeMille; Rebecca L. Henkel; Peter K. Zacharias (57) ABSTRACT

A method for operating an agricultural vehicle. The method including capturing, by the at least one image capturing device, image data of the implement and receive, by the controller, the image data of the implement. The method further includes identifying the implement, by the controller, depending at least in part upon the image data of the implement. The method further includes setting, by the controller, at least one operational parameter of the implement, and managing, by the controller, a turning maneuver of the agricultural vehicle depending at least in part upon the image data of the implement.

18 Claims, 4 Drawing Sheets

(56) References Cited

U.S. PATENT DOCUMENTS

| | | | |
|---|---|---|---|
| 9,305,216 B1* | 4/2016 | Mishra | G06F 16/583 |
| 9,446,713 B2 | 9/2016 | Lu et al. | |
| 9,944,318 B2 | 4/2018 | Hilnbrand et al. | |
| 10,046,800 B2 | 8/2018 | Hu et al. | |
| 10,049,298 B2 | 8/2018 | Kraeling et al. | |
| 10,266,201 B2 | 4/2019 | Dang et al. | |
| 10,405,535 B2 | 9/2019 | Rees | |
| 10,795,372 B2* | 10/2020 | Runde | G05D 1/0221 |
| 10,940,727 B2* | 3/2021 | Billich | A01B 59/004 |
| 11,315,258 B1* | 4/2022 | Anagnostopoulos | A01B 69/001 |
| 2005/0055147 A1* | 3/2005 | Hrazdera | A01B 79/005 |
| | | | 701/50 |
| 2006/0048953 A1* | 3/2006 | Rozendaal | A01B 61/046 |
| | | | 172/35 |
| 2016/0313737 A1* | 10/2016 | Berkemeier | G05D 1/0212 |
| 2017/0112044 A1* | 4/2017 | Stratton | A01B 79/005 |
| 2017/0297621 A1* | 10/2017 | Bunderson | B60W 30/10 |
| 2017/0339821 A1* | 11/2017 | Ray | G05D 1/0088 |
| 2017/0344004 A1* | 11/2017 | Foster | G05D 1/0212 |
| 2018/0109762 A1 | 4/2018 | Aich et al. | |
| 2018/0373256 A1* | 12/2018 | Runde | G05D 1/0223 |
| 2019/0016184 A1* | 1/2019 | Billich | B60D 1/06 |
| 2019/0210418 A1 | 7/2019 | Hall et al. | |
| 2020/0353977 A1* | 11/2020 | Davies | B62K 5/08 |
| 2020/0387720 A1* | 12/2020 | Stanhope | A01B 79/02 |
| 2021/0043085 A1* | 2/2021 | Kreiling | E02F 3/96 |
| 2021/0201531 A1* | 7/2021 | Creaby | A01B 69/001 |

FOREIGN PATENT DOCUMENTS

| | | | | |
|---|---|---|---|---|
| CN | 111754577 A * | 10/2020 | | G06K 9/00664 |
| DE | 102016212455 A1 * | 1/2018 | | |
| DE | 20 2017 105 279 U1 | 1/2019 | | |
| EP | 3 299 996 A1 | 3/2018 | | |
| EP | 3603379 B1 * | 7/2022 | | A01D 45/021 |
| JP | 2011172495 A * | 9/2011 | | |
| JP | 5560762 B2 * | 7/2014 | | |
| JP | 2020012323 A * | 1/2020 | | |
| JP | 7058569 B2 * | 4/2022 | | |
| WO | WO-2004077926 A2 * | 9/2004 | | A01B 35/16 |

OTHER PUBLICATIONS

"Nonlinear Model Predictive Trajectory Control in Tractor-Trailer System for Parallel Guidance in Agricultural Field Operations", J. Backman et al., IFAC AgriControl 2010 conference, Kyoto, Japan, 2010, pp. 133-138 (6 pages).

"Development and Implementation of a Team of Robotic Tractors for Autonomous Peat Moss Harvesting", David A. Johnson, et al., Journal of Field Robotics 26(6-7), pp. 549-571, 2009 (23 pages).

"Driver Assistance System for Backward Maneuvers in Passive Multi-trailer Vehicles", Jesus Morales et al., 2012 IEEE/RSJ International Conference on Intelligent Robots and Systems, Oct. 7-12, 2012, pp. 4853-4858 (6 pages).

"Comparison of controls for a stereo camera based reversing assistance system for vehicle trailer combinations", Ilja Stasewitsch, et al., Bornimer Agrartechnische Berichte, Heft 101, ISSN 0947-7314, (9 pages).

"Implementation of Active Steering on A Multiple Trailer Long Combination Vehicle", A.M.C. Odhams et al., Cambridge University, Engineering Department, pp. 1-13, 2010 (13 pages).

\* cited by examiner

AUTOMATIC IMPLEMENT DETECTION AND MANAGEMENT SYSTEM

BACKGROUND OF THE INVENTION

The present invention pertains to agricultural vehicles and, more specifically, to a system for detecting and managing an implement which is attached to an agricultural vehicle.

Farmers utilize a wide variety of implements to prepare soil for planting. For example, a strip tillage implement is capable of collectively tilling soil in strips along the intended planting rows, moving residue to the areas in between rows, and preparing the seedbed of the strip in preparation for planting. As another example, a field cultivator is capable of simultaneously tilling soil and leveling the tilled soil in preparation for planting.

Some modern implements may automatically identify themselves to the control system of the agricultural vehicle upon being electrically coupled to the agricultural vehicle, for example by way of an ISOBUS connection. However, some implements may not include modern electronics. In such cases, the operator must manually identify the implement type within the control software of the agricultural vehicle in order to properly set operational parameters and log implement data. As can be appreciated, the operator may forget to identify or improperly identify the implement; thus, causing suboptimal operation and improper data collection. Therewith, the operator or an automatic guidance system may improperly conduct a turning maneuver if an implement is improperly identified. For instance, the operator or guidance system may conduct an overly narrow end-of-row turn, which may lead to the implement contacting the agricultural vehicle. If the contact between the implement and the agricultural vehicle is severe, then such contact may damage the implement or the agricultural vehicle What is needed in the art is a system and method to automatically identify an implement and manage the operation thereof.

SUMMARY OF THE INVENTION

Exemplary embodiments provided according to the present disclosure include a method and an agricultural system for the automatic detection and management of an implement which is towed behind an agricultural vehicle. The agricultural vehicle automatically detects a type of implement, sets the operational parameters, and manages turning maneuvers based at least in part upon the sensed and real-time position of the implement relative to the agricultural vehicle.

In some exemplary embodiments provided in accordance with the present disclosure, a method for operating an agricultural vehicle is provided. The agricultural vehicle includes a controller and at least one image capturing device operably connected to the controller. The agricultural vehicle tows an implement. The method includes capturing, by the at least one image capturing device, image data of the implement, receiving, by the controller, the image data of the implement, and identifying the implement, by the controller, depending at least in part upon the image data of the implement. The method also includes setting, by the controller, at least one operational parameter of the implement, and managing, by the controller, a turning maneuver of the agricultural vehicle depending at least in part upon the image data of the implement.

In some exemplary embodiments provided in accordance with the present disclosure, an agricultural vehicle which is configured to tow an implement is provided. The agricultural vehicle includes a frame and at least one image capturing device connected to the frame. The at least one image capturing device is configured to capture image data of the implement. The agricultural vehicle also includes a controller operably connected to the at least one image capturing device. The controller is configured to receive the image data of the implement, identify the implement depending at least in part upon the image data of the implement, set at least one operational parameter of the implement, and manage a turning maneuver of the agricultural vehicle depending at least in part upon the image data of the implement.

One possible advantage that may be realized by exemplary embodiments provided according to the present disclosure is that an operator does not need to manually identify the type of the implement.

Another possible advantage that may be realized by exemplary embodiments provided according to the present disclosure is that turning maneuvers may be optimized, automatically without operator input, by reducing the turning radius to its minimum value without risking damage to the implement and the agricultural vehicle.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
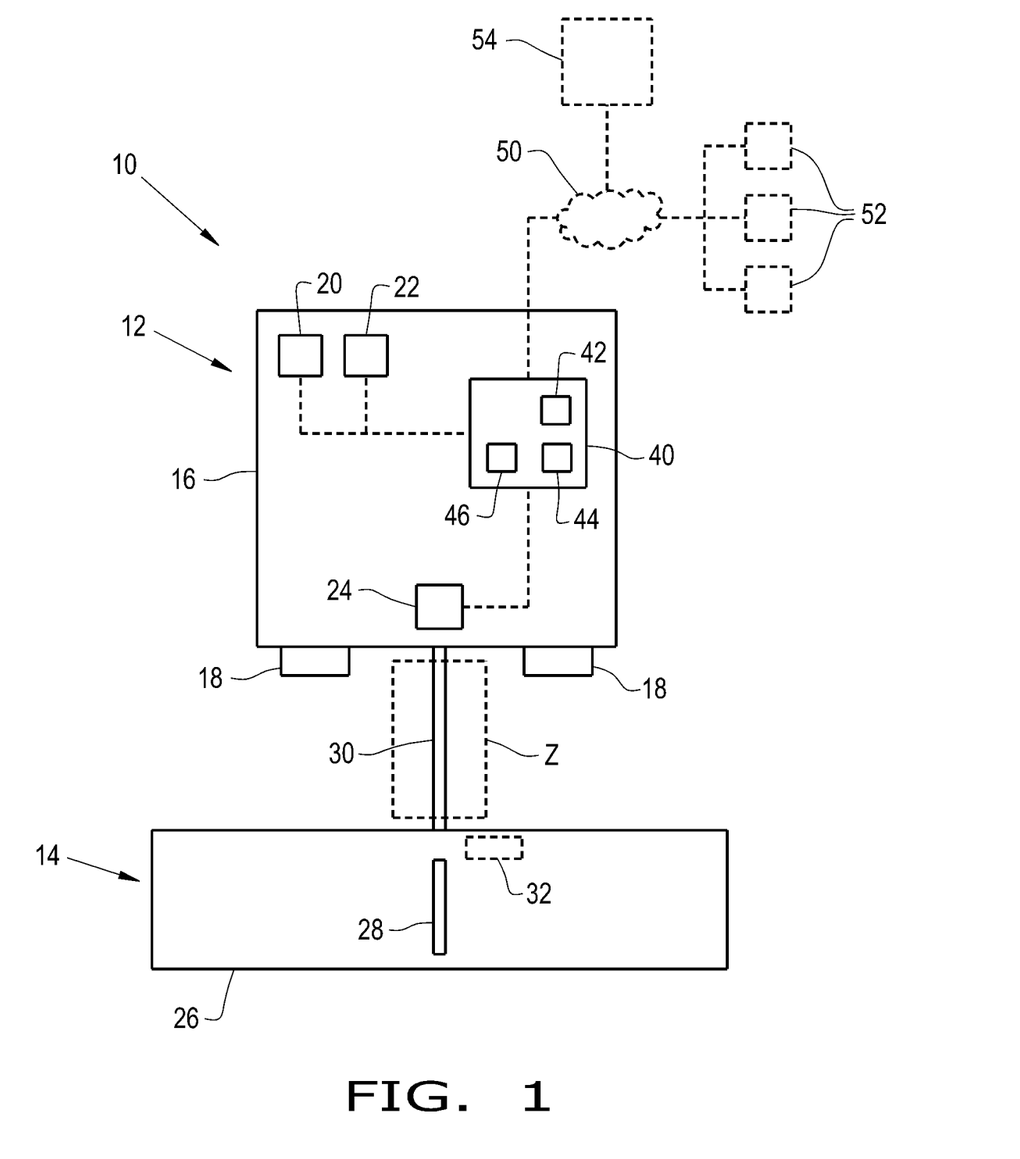
FIG. 1 illustrates a schematic view of an exemplary embodiment of an agricultural system that includes an autonomous or semi-autonomous agricultural vehicle and an implement.
Figure 2:
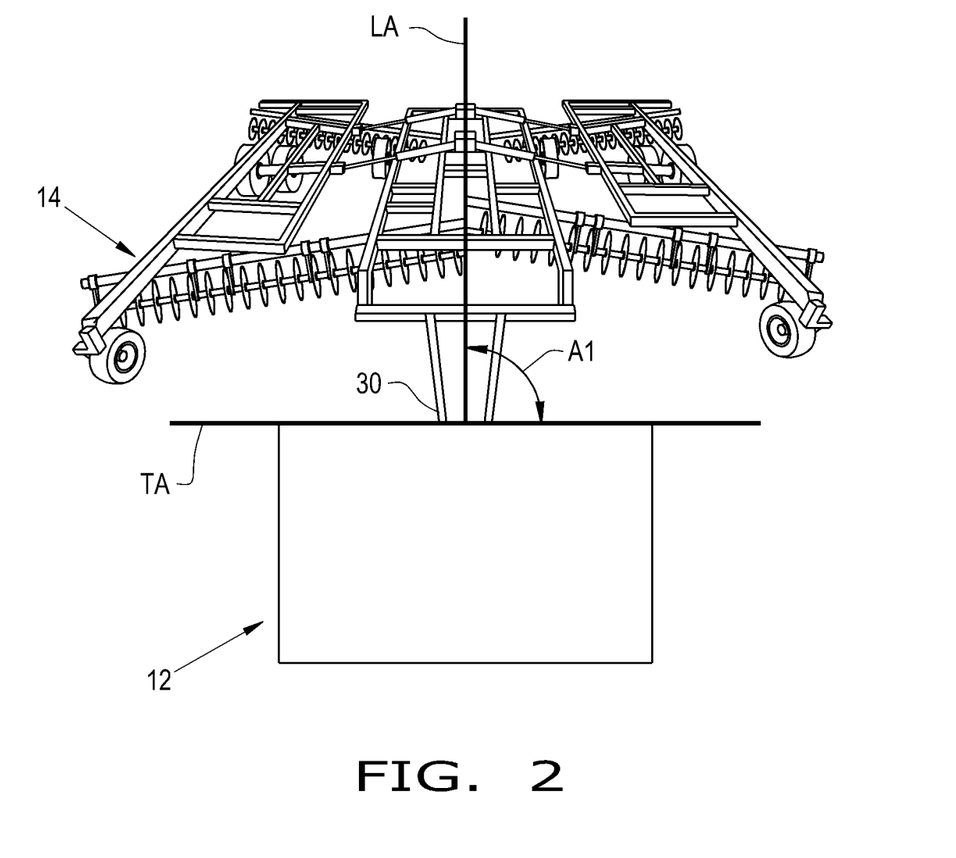
FIG. 2 illustrates a perspective view of the implement of FIG. 1 which is connected to the agricultural vehicle, wherein the agricultural vehicle is shown in schematic form.

Referring now to the drawings, and more particularly to FIGS. 1-2, there is shown an autonomous or semi-autonomous agricultural system 10 that generally includes an autonomous or semi-autonomous agricultural vehicle 12 and an agricultural implement 14 connected to the agricultural vehicle 12.

The agricultural vehicle 12 may generally include a frame 16, a prime mover, a cab, and wheels and/or tracks 18. It is noted that only the rear wheels and/or tracks 18 are illustrated in FIG. 1. The agricultural vehicle 12 may also include a user interface 20 located within the cab and a steering system 22 for steering the agricultural vehicle 12. The user interface 20 may include a selection program or picklist which allows the operator to input a type of the implement 14 as well as the operational parameters, e.g. implement and/or vehicle settings such as tool depth, down pressure, ground speed, etc. The steering system 22 may generally include proportional or directional control valves that are hydraulically connected to a steering actuator for steering the wheels and/or tracks 18 of the agricultural vehicle 12. The agricultural vehicle 12 may be in the form of any desired agricultural machine, such as a tractor, which is capable of being fully or at least partially autonomously operated.

The agricultural vehicle 12 may also include at least one image capturing device 24. The at least one image capturing device 24 may capture pictures and/or videos of the implement 14 and the area surrounding the implement 14. The at least one image capturing device 24 may collect the image data before the implement 14 has been connected to the agricultural vehicle 12, during the connection process, and/or after the implement 14 has been connected to the agricultural vehicle 12. For instance, the image capturing device 24 may continually collect image data throughout a farming operation or selectively capture image data only during a connection process and a turning maneuver. Each image capturing device 24 may be connected to the frame 16. The at least one image capturing device 24 may be in the form of a camera, such as a backup camera.

The implement 14 may be pivotally connected to and towed by the agricultural vehicle 12. The implement 14 generally includes a main frame 26, a subframe 28, wheels connected to the main frame 26, various ground-engaging tools mounted to the frame 26 and/or the subframe 28, and a tongue or drawbar 30 which pivotally connects to the agricultural vehicle 12. Once connected to the agricultural vehicle 12, the longitudinal axis LA of the implement 14, e.g. the drawbar 30 thereof, may define an angle A1 relative to a transverse axis TA of the agricultural vehicle 12, e.g. an axis which is perpendicular to the forward direction of travel (FIG. 2). The implement 14 may also optionally include at least one identifying characteristic 32. The at least one identifying characteristic 32 may include a brand name, a logo, a model number, and/or a QR code. The implement 14 may be in the form of any desired ground-engaging implement, such as a field cultivator, a disk ripper, a fertilizer applicator implement, or a sweep. It should be appreciated that the implement 14 may also incorporate a fertilizer device and/or a portion thereof. As can be appreciated, the implement 14 may not include a "smart" electrical connection which interfaces the agricultural vehicle 12.

The autonomous or semi-autonomous agricultural system 10 may further include a controller 40 with a memory 42. The controller 40 may be incorporated into the agricultural vehicle 12. The controller 40 can be operably connected to the user interface 20, the steering system 22, and each image capturing device 24. The controller 40 may also be additionally connected to any other desired sensor, including a global positioning system (GPS) location sensor, a speed sensor, and/or an inclinometer.

The controller 40 may comprise the Case IH Advanced Farming System® (AFS), which may collectively and automatically control and record the operation of the agricultural vehicle 12 and the implement 14. The controller 40 may comprise one or more systems for identifying the implement 14, recording data relating to the agricultural vehicle 12 and/or the implement 14, and controlling the operation of the agricultural vehicle 12 and/or the implement 14. Therein, the controller 40 may include an automatic vehicle guidance system 44, which actively controls the steering system 22, and a data management system 46 for recording data relating to the agricultural vehicle 12 and/or the implement 14. Hence, the controller 40 can continually calculate a vehicle steering heading or turning maneuver by comparing vehicle position and directional heading to a desired travel path, and further by incorporating a determined minimum turning angle and/or interference zone Z (FIG. 1). Thereafter, the controller 40 may send the vehicle steering heading output signal and/or the steer-limit output signal to the steering system 22, which in turn steers the wheels and/or tracks 18. The controller 40 may also comprise one or more communication interfaces which may be configured to use standardized protocols for communication such as TCP/IP, Bluetooth, CAN protocol and higher-layer protocols such as HTTP, TLS, and the like.

Figure 3:
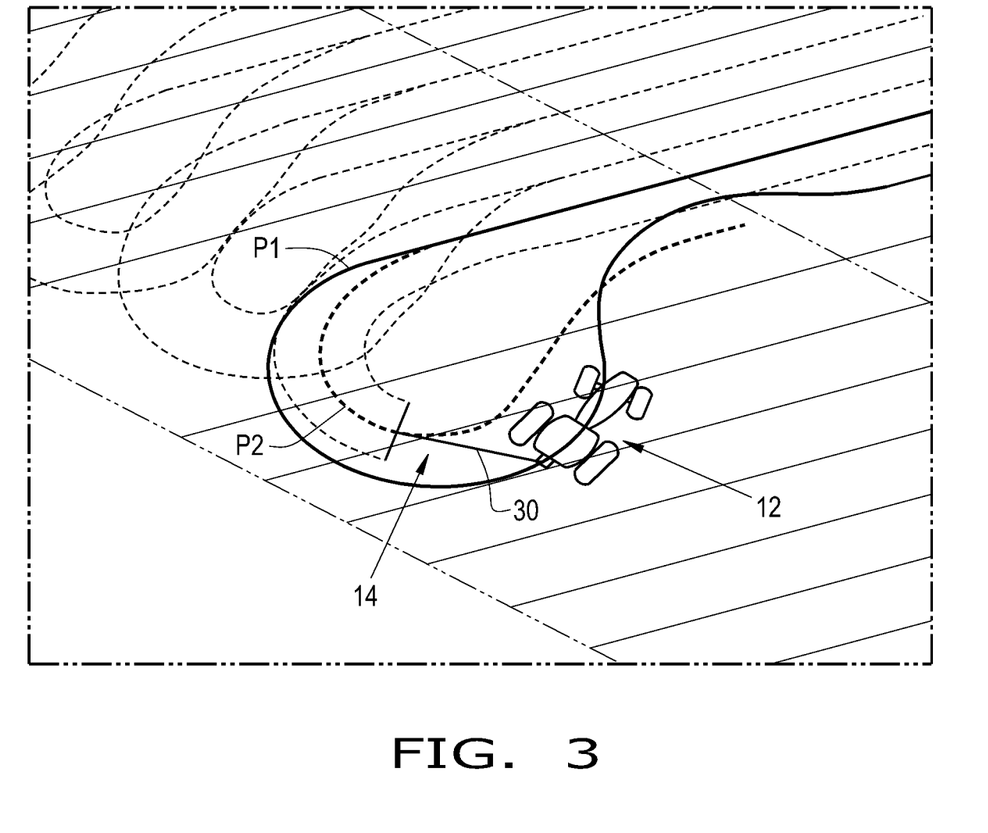
FIG. 3 illustrates a perspective view of an end-of-row turning maneuver of the agricultural vehicle.

Additionally, the controller 40 may automatically conduct implement detection and turn management of the agricultural vehicle 12. More particularly, the controller 40 may receive the image data from the image capturing device(s) 24, identify the implement 14 depending at least in part upon the image data, set at least one operational parameter, and manage a turning maneuver of the agricultural vehicle 12 depending at least in part upon the image data. As can be appreciated a turning maneuver may include any desired turning operation of the agricultural vehicle 12, such as an end-of-row turn in the headland area of the field. For instance, FIG. 3 illustrates the agricultural vehicle 12 conducting a left-hand, end-of-row turn along a path P1 wherein the agricultural implement follows along path P2. During the left-hand turning maneuver, the left wheel 18 of the agricultural vehicle 12 may become too close or contact the drawbar 30 of the implement 12.

In identifying the implement 14, the controller 40 can compare the image data collected by the image capturing device 24 to a database of implements and match the implement 14 to one implement of the database of implements. For instance, the controller 40 may compare one or more identifying characteristics of the implement 14, such as brand name or logo 32, with identifying characteristics of known implements. Therewith, in identifying the implement 14, the controller 40 may conduct a machine learning algorithm or other deep-learning artificial intelligence algorithm to, at least partially, create the database of implements and to identify the implement 14. It should be appreciated that the database of implements may comprise information of various types of implements and the identifying characteristics associated with the various types of implements. Such identifying characteristic information may include the brand name, model number, height and/or shape of the frame and/or subframe, QR code(s), accompanying tools, etc.

Additionally, the controller 40 may also streamline the implement selection process within the data management system 46. For instance, the controller 40 may populate a picklist with one or more possible implements from which the operator may choose. Also, for instance, the controller 40 may automatically select the appropriate implement in the data management system 46. Thereby, by way of example only, the operator may initially choose the implement 14 within the data management system 46, and the controller may subsequently automatically select the implement 14 by way of the machine learning algorithm. Thereafter, the controller 40 may automatically set the initial settings and/or operational parameters of the implement 14.

The controller 40 may optimize the turning maneuver by minimizing a turning radius of the agricultural vehicle 12. In managing the turning maneuver, the controller 40 may also artificially limit a maximum turning angle of the agricultural vehicle 12 to prevent interference between the implement 14 and the agricultural vehicle 12. Furthermore, the controller 40 may determine the angle A1 of the drawbar 30 relative to the agricultural vehicle 12 depending at least in part upon the image data such that the artificial limit of the maximum turning angle of the agricultural vehicle 12 depends upon the real-time angle A1 of the drawbar relative to the agricultural vehicle 12. It should be appreciated that the controller 40 may also monitor a portion of the agricultural vehicle 12, e.g. the wheels and/or tracks 18, relative to the position of the drawbar 30. Additionally or alternatively, the controller 40 may determine an interference zone Z of the drawbar 30. If a portion of the agricultural vehicle 12, e.g. the rear wheels and/or tracks 18, enters or occupies the interference zone Z, it may signify that a potential interference, i.e., contact, between the agricultural vehicle 12 and the implement 14 may occur. The controller 40 may determine the interference zone Z by defining an area which is a preselected distance away from each side of the drawbar 30. Thereafter, the controller 40 may set the artificial limit of the maximum turning angle of the agricultural vehicle 12 depending upon a position of the agricultural vehicle 12 relative to the interference zone Z of the drawbar 30. As used herein, the term interference zone refers to an area surrounding at least a portion of the drawbar 30.

Also, the controller 40 may manage the turning maneuvers by determining and sending a steer-limit output signal to the steering system 22. The steer-limit output signal may correspond to a predetermined minimum angle and/or desired interference zone Z. Upon receiving the output signal from the controller 40, the steering system 22 may prevent the agricultural vehicle 12 from turning beyond the maximum turning angle of the agricultural vehicle 12 which was artificially limited by the controller 40 for a specific implement type.

The controller 40 may also automatically steer the agricultural vehicle 12, via the automatic vehicle guidance system 44, during the turning maneuver. Therein, the controller 40 may automatically control the steering system 22 to minimize a turning radius of the agricultural vehicle 12 and prevent interference between the implement 14 and the agricultural vehicle 12.

The autonomous or semi-autonomous agricultural system 10 may also optionally include a network 50 which operably couples the agricultural vehicle 12 to one or more other agricultural vehicles 52. Thereby, the agricultural vehicle 12 can be part of a neural network comprising at least one other agricultural vehicle 52. The network 50 may operably connect the controller 40 to the controllers of the other agricultural vehicles 52. The network 50 may be configured to receive and transmit the image data of the implement 14. The network 50 may be any suitable network, including a wireless network having one or more processors or nodes. Additionally, the network 50 may broadly represent any combination of one or more data communication networks including local area networks, wide area networks, etc., using a wired or wireless connection.

Furthermore, the autonomous or semi-autonomous agricultural system 10 may also optionally include a remote machine learning or data center 54. In cooperation with the controller 40, the data center 54 may also be configured to receive, process, and record the image data of the implement 14. Additionally, the data center 54 may include one or more processors arranged to conduct a machine learning algorithm or other deep-learning artificial intelligence algorithm to, at least partially, create the database of implements and/or to identify the implement 14.

Figure 4:
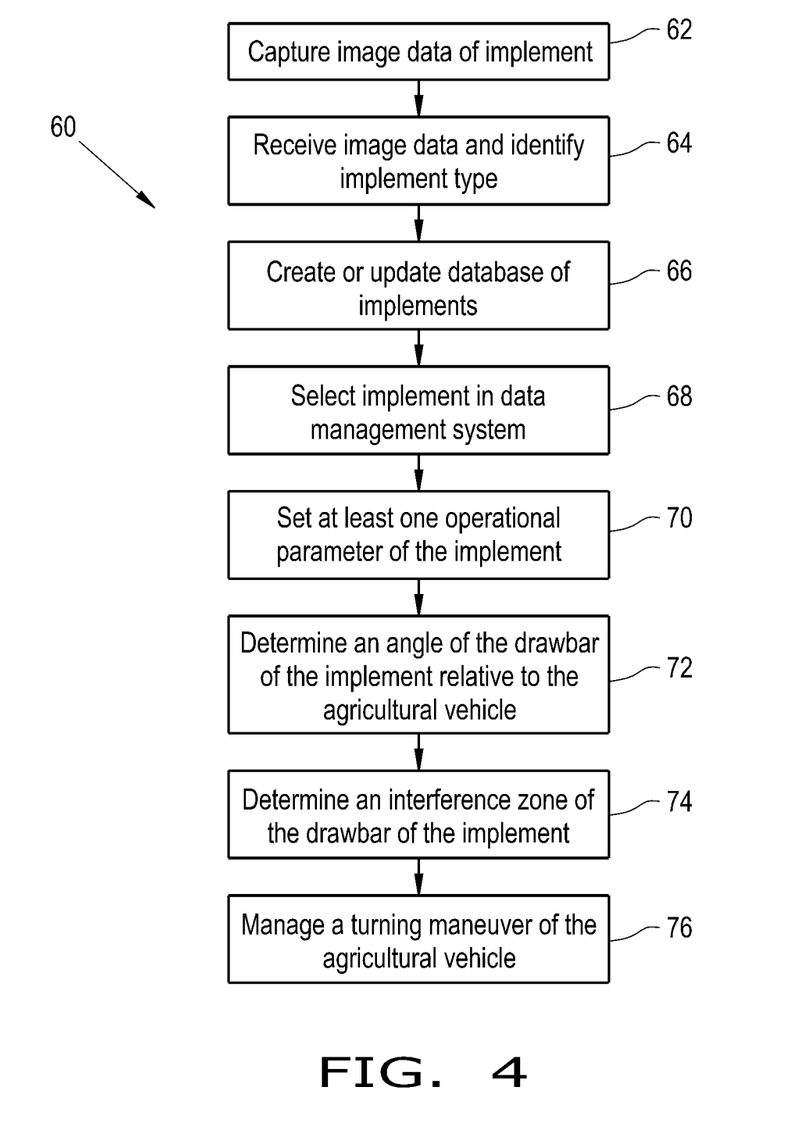
FIG. 4 illustrates a flowchart of a method for operating the agricultural vehicle.

Referring now to FIG. 4, there is shown a flowchart of a method 60 for operating the agricultural vehicle 12 of the agricultural system 10. The at least one image capturing device 24 captures image data of the implement 14 (at block 62). The controller 40 receives the image data and identifies the type of the implement 14 (at block 64). The controller 40 and/or the data center 54 may create a database of implements and/or update a premade database of implements (at block 66). The controller 40 may automatically select the implement 14 within the data management system 46 so that the implement data is appropriately logged (at block 68). The controller 40 may then set at least one operational parameter of the implement, which may include one or more settings of the implement 14 and/or the agricultural vehicle 12 such as tool depth, down pressure, ground speed, etc. (at block 70). Thereafter, the controller 40 may determine the angle A1 of the drawbar 30 relative to the agricultural vehicle 12 (at block 72) and/or determine the interference zone Z of the drawbar 30 (at block 74). Thereafter, the controller 40 may manage one or more turning maneuvers of the agricultural vehicle 12 (at block 76).

It is to be understood that the steps of the method 60 may be performed by the controller 40 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 40 described herein, such as the method 60, is implemented in software code or instructions which are tangibly stored on a tangible computer readable medium. The controller 40 loads the software code or instructions via a direct interface with the computer readable medium or via a wired and/or wireless network. Upon loading and executing such software code or instructions by the controller 40, the controller 40 may perform any of the functionality of the controller 40 described herein, including any steps of the method 60 described herein.

The term "software code" or "code" used herein may refer to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A method for operating an agricultural vehicle, the agricultural vehicle comprising a controller and at least one image capturing device operably connected to the controller, the agricultural vehicle towing an implement, the method comprising:
   capturing, by the at least one image capturing device, image data of the implement;
   receiving, by the controller, the image data of the implement;
   identifying the implement, by the controller, depending at least in part upon the image data of the implement;
   setting, by the controller, at least one operational parameter of the implement;
   determining an interference zone by defining an area that extends a predefined distance away from each side of a drawbar; and
   managing, by the controller, a turning maneuver of the agricultural vehicle depending at least in part upon the image data of the implement, which includes optimizing the turning maneuver by minimizing a turning radius of the agricultural vehicle while artificially limiting a maximum turning angle of the agricultural vehicle based on a position of the agricultural vehicle relative to the interference zone to prevent interference between the implement and the agricultural vehicle.

2. The method of claim 1, wherein the method further comprises determining, by the controller, an angle of the drawbar relative to the agricultural vehicle depending at least in part upon the image data of the implement, wherein the controller artificially limits the maximum turning angle of the agricultural vehicle depending upon the angle of the drawbar relative to the agricultural vehicle.

3. The method of claim 1, wherein the agricultural vehicle comprises a steering system operably connected to the controller, wherein the controller is configured to determine and send a steer-limit output signal to the steering system so that the steering system prevents the agricultural vehicle from turning beyond the maximum turning angle of the agricultural vehicle which was artificially limited by the controller.

4. The method of claim 3, wherein managing the turning maneuver comprises automatically steering the agricultural vehicle during the turning maneuver by way of the controller automatically controlling the steering system to minimize a turning radius of the agricultural vehicle and prevent interference between the implement and the agricultural vehicle.

5. The method of claim 1, wherein identifying the implement comprises comparing the image data of the implement to a database of implements and matching the implement to one implement of the database of implements.

6. The method of claim 5, wherein the controller is operably connected to a network which operably connects the agricultural vehicle to at least one other agricultural vehicle.

7. The method of claim 5, wherein the controller is configured to conduct a machine learning algorithm to, at least partially, create the database of implements and to identify the implement.

8. An agricultural vehicle configured to tow an implement, the agricultural vehicle comprising:
   a frame;
   at least one image capturing device connected to the frame, the at least one image capturing device being configured to capture image data of the implement; and
   a controller operably connected to the at least one image capturing device, the controller being configured to:
      receive the image data of the implement;
      identify the implement depending at least in part upon the image data of the implement;
      set at least one operational parameter of the implement;
      determine an interference zone by defining an area that extends a predefined distance away from each side of a drawbar; and
      manage a turning maneuver of the agricultural vehicle depending at least in part upon the image data of the implement, which includes optimizing the turning maneuver by minimizing a turning radius of the agricultural vehicle while artificially limiting a maximum turning angle of the agricultural vehicle based on a position of the agricultural vehicle relative to the interference zone to prevent interference between the implement and the agricultural vehicle.

9. The agricultural vehicle of claim 8, wherein the controller is further configured to determine an angle of the drawbar relative to the agricultural vehicle depending at least in part upon the image data of the implement, wherein the controller is configured to artificially limit the maximum turning angle of the agricultural vehicle depending upon the angle of the drawbar relative to the agricultural vehicle.

10. The agricultural vehicle of claim 8, further comprising a steering system operably connected to the controller, wherein the controller is further configured to determine and send a steer-limit output signal to the steering system so that the steering system prevents the agricultural vehicle from turning beyond the maximum turning angle of the agricultural vehicle which was artificially limited by the controller.

11. The agricultural vehicle of claim 10, wherein the controller is further configured to automatically steer the agricultural vehicle during the turning maneuver by way of the controller automatically controlling the steering system to minimize a turning radius of the agricultural vehicle and prevent interference between the implement and the agricultural vehicle.

12. The agricultural vehicle of claim 8, wherein the controller is configured to compare the image data of the implement to a database of implements and match the implement to one implement of the database of implements in order to identify the implement.

13. The agricultural vehicle of claim 12, wherein the controller is operably connected to a network which operably connects the agricultural vehicle to at least one other agricultural vehicle.

14. The agricultural vehicle of claim 12, wherein the controller is configured to conduct a machine learning algorithm to, at least partially, create the database of implements and to identify the implement.

15. The method of claim 1, wherein setting the at least one operational parameter of the implement includes automatically setting one or more settings of at least one of the implement or the agricultural vehicle after the implement is identified.

16. The method of claim 15, wherein the one or more settings includes at least one of tool depth, down pressure, or ground speed.

17. An agricultural vehicle system comprising:
   an image capturing device configured to capture image data of an implement being towed by an agricultural vehicle; and
   a controller configured to:
      receive the image data of the implement;
      identify the implement based at least in part on the image data of the implement;

determine an interference zone by defining an area that extends a predefined distance away from each side of a drawbar; and manage a turning maneuver of the agricultural vehicle based at least in part on the image data of the implement, which includes optimizing the turning maneuver by minimizing a turning radius of the agricultural vehicle while artificially limiting a maximum turning angle of the agricultural vehicle based on a position of the agricultural vehicle relative to the interference zone to prevent interference between the implement and the agricultural vehicle.

18. The agricultural vehicle system of claim 17, wherein the controller is configured to automatically set one or more settings of at least one of the implement or the agricultural vehicle, after the implement is identified, to set an operational parameter of the implement.

\* \* \* \* \*